(12) United States Patent
Hayashi

(10) Patent No.: US 11,726,727 B2
(45) Date of Patent: Aug. 15, 2023

(54) SERVER AND COMPUTER PROGRAM FOR SERVER

(71) Applicant: BROTHER KOGYO KABUSHIKI KAISHA, Nagoya (JP)

(72) Inventor: Koichi Hayashi, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 17/679,354

(22) Filed: Feb. 24, 2022

(65) Prior Publication Data

US 2022/0276815 A1    Sep. 1, 2022

(30) Foreign Application Priority Data

Feb. 26, 2021 (JP) .................................. 2021-030866

(51) Int. Cl.
*G06F 3/12* (2006.01)
*H04N 1/32* (2006.01)

(52) U.S. Cl.
CPC .......... *G06F 3/1226* (2013.01); *G06F 3/1204* (2013.01); *H04N 1/32416* (2013.01); *H04N 2201/3295* (2013.01)

(58) Field of Classification Search
None
See application file for complete search history.

(56) References Cited

U.S. PATENT DOCUMENTS

2015/0277821 A1  10/2015  Mori
2017/0093865 A1  3/2017  Watanabe et al.
2017/0111398 A1*  4/2017  Shiraishi ............... H04L 63/083
2019/0238712 A1*  8/2019  Nagasaki ........... H04N 1/00244
2021/0042064 A1*  2/2021  Ando .................. H04L 67/1097

FOREIGN PATENT DOCUMENTS

EP         3 151 108 A1    4/2017
JP         2017-068722 A   4/2017

OTHER PUBLICATIONS

Extended European Search Report dated Jun. 29, 2022 from related EP 22 15 8574.

* cited by examiner

*Primary Examiner* — Frantz Bataille
(74) *Attorney, Agent, or Firm* — Scully, Scott, Murphy & Presser, P.C.

(57) ABSTRACT

A server includes memory, a registration request receiver, a first determiner, and a first memory controller. The memory stores device identification information and service identification information in association with each other. The registration request receiver receives from an external device, a registration request including first service identification information and specific device identification information. The first service identification information identifies a first service to be provided to a user of a specific communication device. The specific device identification information identifies the specific communication device. In response to the registration request received from the external device, the first determiner determines whether to provide the first service to the user of the specific communication device. In response to a determination to provide the first service, the first memory stores the first service identification information in the memory in association with the specific device identification information.

8 Claims, 11 Drawing Sheets

FIG. 3
(Printer Registration Sequence)

Participants: Terminal, Printer 100, SP server 1A~3B, Mediation server 10

- (T10) Account registration operation [Terminal]
- (T12) Account registration request [Terminal → SP server]
- (T20) Registration screen data [SP server → Terminal]
- (T30) Display [Terminal]
- (T32) Input operation [Terminal]
- (T34) Email address MA, password PW, email address AD, charging information C1 [Terminal → SP server]
- (T40) Register user account UA1 [SP server]
- (T50) Account request [SP server → Mediation server]
- (T52) Generate mediation server account SA1 [Mediation server] — SA1
- (T54) SA1 [Mediation server → SP server]
- (T56) Store UA1-SA1 [SP server]
- (T60) Account registration result [SP server → Terminal]
- (T62) Display [Terminal]
- (T70) Printer registration instruction [Terminal]
- (T72) Printer registration request [Terminal → SP server]
- (T74) PIN request (SA1) [SP server → Mediation server]
- (T76) Generate PIN code PC1 [Mediation server] — SA1-PC1
- (T78) PC1 [Mediation server → SP server]
- (T80) Display [Terminal]

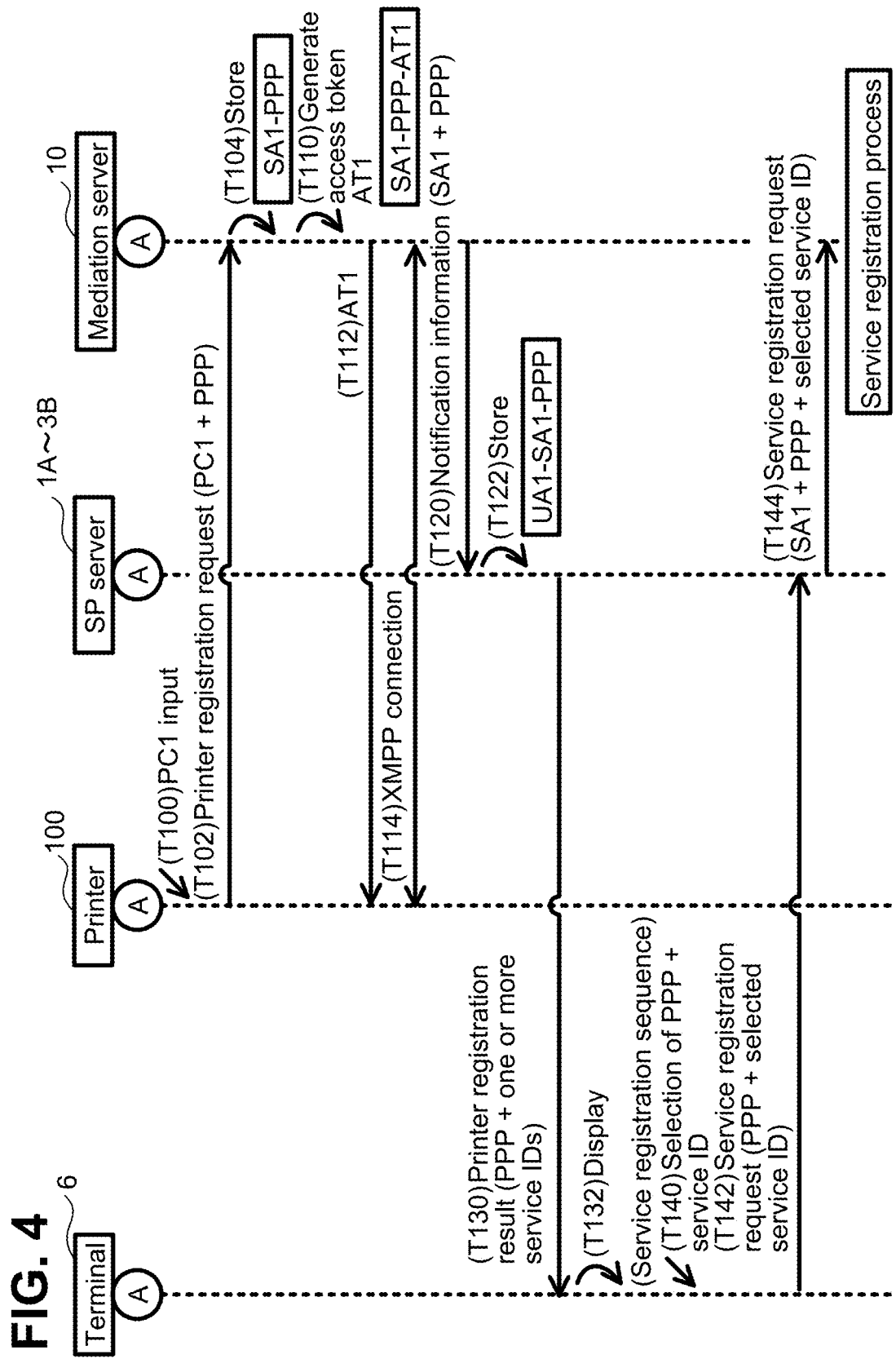

FIG. 6 (Specific Case)

(Service Stop Sequence)

SERVER AND COMPUTER PROGRAM FOR SERVER

CROSS-REFERENCE TO RELATED APPLICATION

This application claims priority from Japanese Patent Application No. 2021-030866 filed on Feb. 26, 2021, the content of which is incorporated herein by reference in its entirety.

TECHNICAL FIELD

Aspects of the disclosure relate to a technique for providing a service using a server to a user of a communication device.

BACKGROUND

A known server registers a user account of a user of a printer in association with a service provided to the user. The server further stores the service and a category of the service in association with each other. The server does not provide multiple services of the same category to the user at one time. That is, if a service of a category is associated with a certain user account, the server does not display other services of the category as available services.

SUMMARY

According to an aspect of the disclosure, a server includes memory, a registration request receiver, a first determiner, and a first memory controller. The memory stores device identification information and service identification information in association with each other. The device identification information identifies a communication device among one or more communication devices. The service identification information identifies a service currently provided to a user of the communication device among a plurality of services. The plurality of services include a first type of service having no exclusive attribute and a second type of service having the exclusive attribute. The exclusive attribute indicates that, in a state where a certain type of service is provided to a user of a certain communication device, another service of the certain type is not provided to the user of the certain communication device. The registration request receiver receives, from an external device, a registration request including first service identification information and specific device identification information. The first service identification information identifies a first service to be provided to a user of a specific communication device. The specific device identification information identifies the specific communication device. In response to the registration request received from the external device, the first determiner determines whether to provide the first service to the user of the specific communication device. In response to the first service being the first type of service, the first determiner determines to provide the first service regardless of whether the specific device identification information is stored in association with service identification information different from the first service identification information in the memory. The first determiner determines to provide the first service in response to the first service being the second type of service and the specific device identification information being not stored in association with service identification information identifying the second type of service different from the first service in the memory. The first determiner determines not to provide the first service in a specific case where the first service is the second type of service and the specific device identification information is stored in association with second service identification information in the memory. The second service identification information identifies a second service that is the second type of service different from the first service. In response to a determination to provide the first service, the first memory stores the first service identification information in the memory in association with the specific device identification information.

According to an aspect of the disclosure, a non-transitory computer readable storage mediums stores a computer program for a server including memory and a computer. The memory stores device identification information and service identification information in association with each other. The device identification information identifies a communication device among one or more communication devices. The service identification information identifies a service currently provided to a user of the communication device among a plurality of services. The plurality of services include a first type of service having no exclusive attribute and a second type of service having the exclusive attribute. The exclusive attribute indicates that, in a state where a certain type of service is provided to a user of a certain communication device, another service of the certain type is not provided to the user of the certain communication device. The computer program includes instructions that, when executed, cause the computer to function as a registration request receiver, a first determiner, and a first memory controller, which are described above.

BRIEF DESCRIPTION OF THE DRAWINGS

FIG. 3 is a sequence diagram for printer registration.

FIG. 4 is a sequence diagram continued from FIG. 3 and a sequence diagram for service registration.

DETAILED DESCRIPTION

In some cases, multiple services of the same category can be provided to the user at the same time. This specification provides a technique enabling changing whether to simultaneously provide two or more services having the same type to a user in accordance with the service type that the user requires to register.

Figure 1:
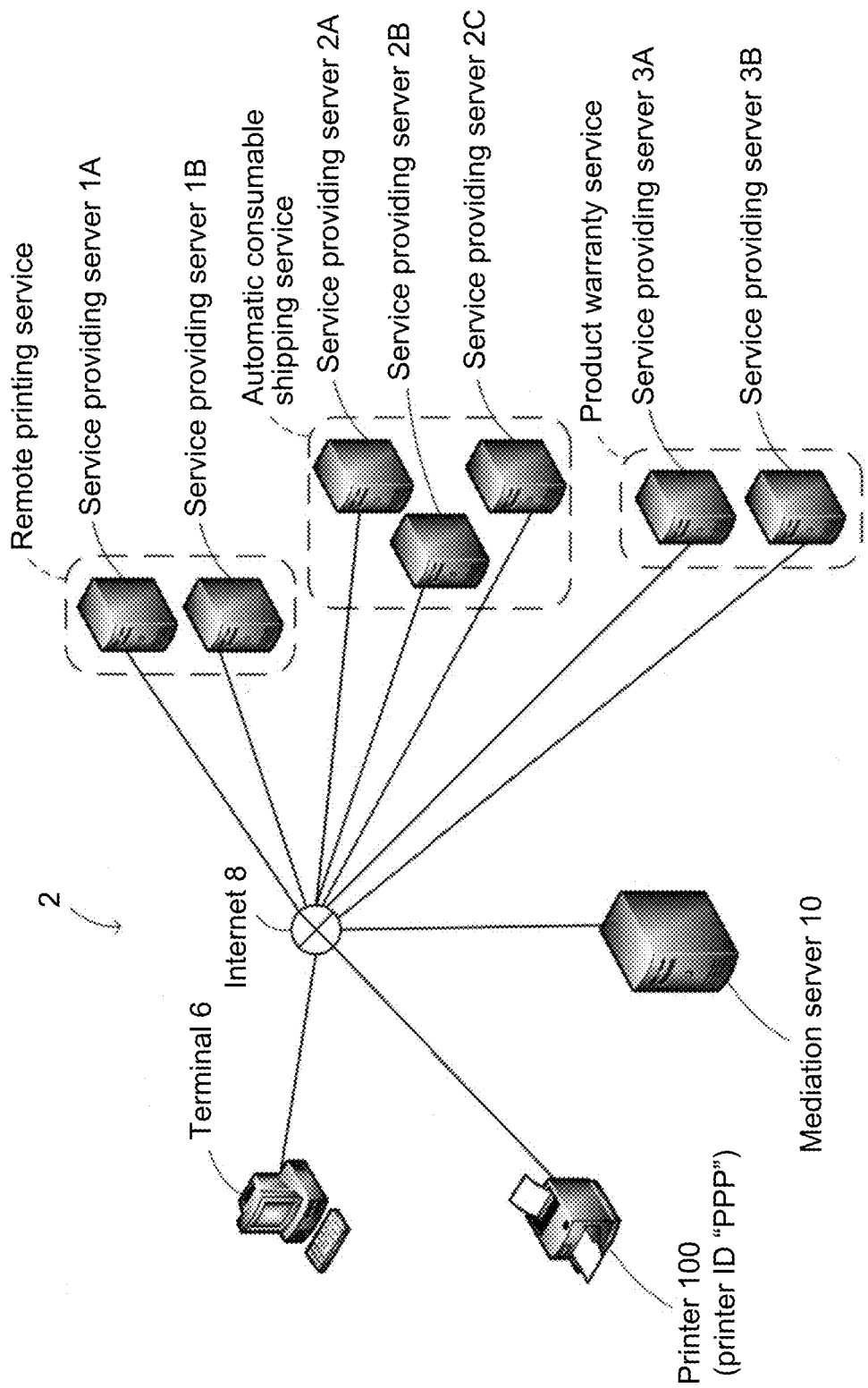
FIG. 1 is a configuration diagram of a communication system.

Configuration of Communication System 2: FIG. 1

A communication system 2 includes devices such as a printer 100, a terminal 6, a mediation server 10, and multiple service providing servers (hereinafter referred to as "SP servers") 1A to 3B. The devices are connected to the Internet 8 and can communicate with each other via the Internet 8.

The terminal 6 is a user terminal used by a user of the printer 100. The mediation server 10 performs various communications to enable the user of the printer 100 to receive a service from the devices such as a SP server 1A.

The SP servers 1A to 3B are installed on the Internet 8 by a vendor of the printer 100 or a different vendor. The SP servers 1A, 1B each provide a remote printing service. The remote printing service allows the printer 100 to perform printing in accordance with image data received from the terminal 6. The SP servers 2A to 2C each provide an automatic consumable shipping service. The automatic consumable shipping service is a service for automatically shipping a new consumable when the remaining amount of a consumable of the printer 100 becomes low. The SP servers 3A and 3B each provide a product warranty service. The product warranty service is a service for maintenance and warranty of the printer 100.

Figure 2:
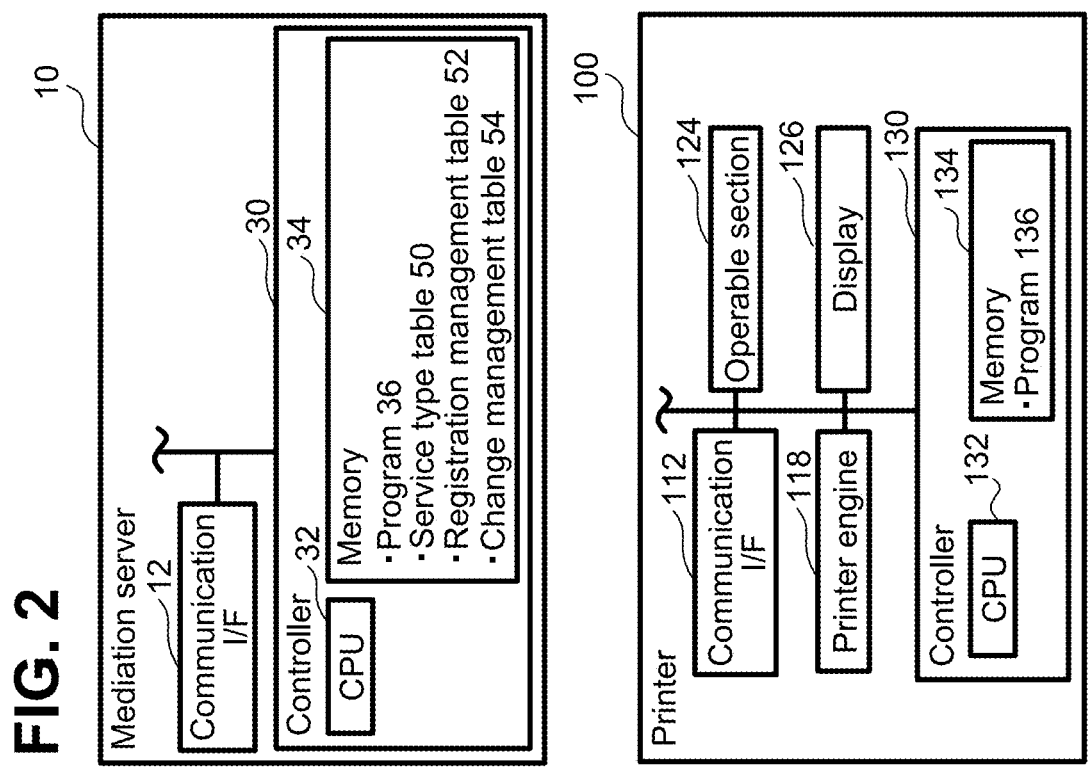
FIG. 2 illustrates a hardware configuration of a mediation server and a printer.

Configuration of Mediation Server 10: FIG. 2

The mediation server 10 is installed on the Internet 8 by the vendor of the printer 100. The mediation server 10 includes a communication interface (hereinafter referred to as an "I/F") 12 and a controller 30. The communication I/F 12 and the controller 30 are connected to a bus line (reference numeral is omitted). The communication I/F 12 is connected to the Internet 8. The controller 30 includes a CPU 32 and memory 34. The CPU 32 performs various processing in accordance with a program 36 stored in the memory 34. The memory 34 includes a volatile memory and a nonvolatile memory. The memory 34 stores a service type table 50, a registration management table 52, and a change management table 54.

The service type table 50 stores records each containing a service ID, a service type, and an exclusive attribute in association with each other. The storage contents of the service type table 50 are predetermined by the vendor of the printer 100. The service ID is information (e.g., a service name) identifying a service provided by each of the SP servers 1A to 3B. The service ID is assigned to each of the SP servers 1A to 3B. The SP server 1A is assigned with a service ID "XXA" and the SP server 1B is assigned with a service ID "XXB". The SP server 2A is assigned with a service ID "YYA", the SP server 2B is assigned with a service ID "YYB", and the SP server 2C is assigned with a service ID "YYC". The SP server 3A is assigned with a service ID "ZZA" and the SP server 3B is assigned with a service ID "ZZB". In the following description, a service identified by the service ID, for example, "XXA" may be simply described as a "service XXA". Other services may be described in the same manner.

The service type is information indicating a type (i.e., category) of service. In this embodiment, the remote printing service may be described as type "Remote", the automatic consumable shipping service may be described as type "Supply", and the product warranty service may be described as type "Warranty".

The exclusive attribute is information indicating that multiple services of the same type are not provided to a user through the same printer at the same time. The presence or absence of an exclusive attribute is set for each service type. For type "Remote", the exclusive attribute is set to "No". That is, type "Remote" does not have the exclusive attribute. This means that two remote printing services corresponding to two SP servers 1A and 1B can be simultaneously provided to a user through the same printer. For type "Supply", the exclusive attribute is set to "Yes". That is, type "Supply" has the exclusive attribute. This means that three automatic consumable shipping services corresponding to three SP servers 2A, 2B, and 2C cannot be provided to the same user at a time. When the remaining amount of a currently used consumable of the printer 100 becomes low, a user using an automatic consumable shipping service for the printer 100 can automatically obtain a new consumable. The user does not need to use other automatic consumable shipping services in addition to the automatic consumable shipping service described above. For this purpose, the exclusive attribute of type "Supply" is set to "Yes". Similarly to type "Supply", the exclusive attribute of type "Warranty" is also set to "Yes".

The registration management table 52 stores records each containing a printer ID identifying a printer, a service ID identifying a service currently provided to a user of the printer, and a service type of the service in association with each other. Each piece of information is stored in the registration management table 52 every time service provision to the user of the printer is started.

The change management table 54 stores records each containing the service ID, the service type, a changeable service ID, and a process during registration in association with each other. The storage contents of the change management table 54 are predetermined by the vendor of the printer 100. The changeable service ID is information that identifies a service whose type has an exclusive attribute and that is changeable from a service of the same type. For example, in the change management table 54, the service ID "YYA" is stored in association with a changeable service ID "YYB". This means that the service "YYA" is changeable to the service "YYB". In contrast, the service ID "YYB" is not associated with a changeable service ID. This means that the service "YYB" is not changeable to another automatic consumable shipping service (e.g., "YYA", "YYC"). Whether a service is changeable to another service depends on the contents of each service. For example, the automatic consumable shipping service can be changed from a service that charges a fee for shipping each consumable to a service that charges a fixed fee in a contract period regardless of the number of consumables to be shipped. In contrast, the latter service, however, cannot be changed to the former service. This is because the service may not be terminated before the expiration of the contract period.

The process during registration is a process to be performed when the SP server starts providing the service. In the change management table 54, each of the service IDs "YYA" and "YYB" is stored in association with a dedicated ink setting process as a process during registration. This means that the SP servers 2A and 2B perform the same dedicated ink setting process upon starting to provide respective services "YYA" and "YYB".

Configuration of Printer 100: FIG. 2

The printer 100 is a peripheral device (of, for example, the terminal 6) having a print function. The printer 100 may be a multifunction peripheral capable of performing a scan function, and a FAX function in addition to the print function. The printer 100 includes an operable section 124, a display 126, a printer engine 118, a communication OF 112, and a controller 130. As illustrated in FIG. 1, the printer 100 is assigned with a printer ID "PPP".

The operable section 124 includes a plurality of keys. The user can input various instructions to the printer 100 by operating the operable section 124. The display 126 is a display for displaying various information. The display 126 also functions as a so-called touchscreen (i.e., an operable section). The printer engine 118 is a print mechanism of an inkjet type, a laser type, or other type. The communication I/F 112 is connected to the Internet 8 via a local area network (LAN) 8.

The controller 130 includes a CPU 132 and memory 134. The CPU 132 performs various processing in accordance with a program 136 stored in the memory 134. The memory 134 includes a volatile memory and a nonvolatile memory.

The printer 100 performs printing using a color material by mounting a color material cartridge which is a consumable. Hereinafter, a cartridge is abbreviated as "CTG" In this embodiment, the printer 100 can print using either a dedicated CTG or a general-purpose CTG different from the dedicated CTG. A dedicated CTG is a cartridge intended for receiving the service "YYA" or "YYB". The general-purpose CTG is a cartridge used when these services "YYA" and "YYB" are not provided.

Printer Registration Sequence: FIG. 3

With reference to FIG. 3, processing for registering information related to the printer 100 in the mediation server 10 will be described. In the following description, the processing performed by a CPU of each device (for example, the CPU 32 of the mediation server 10) is described as the processing performed by a device (for example, the mediation server 10) for ease of understanding. All of the following communications performed by the mediation server 10 and the printer 100 are performed via the communication I/Fs 12 and 112. Therefore, in the following description, when processing related to communication is described, the phrase "via the communication I/F 12 (or 112)" is omitted.

The terminal 6 receives an account registration operation performed by the user at T10. The account registration operation includes inputting of a URL (standing for Uniform Resource Locator) of a desired SP server performed by the user. In the following description, the SP server is referred to as a "target SP server".

Upon receiving an account registration operation performed by the user at T10, the terminal 6 transmits an account registration request to the target SP server at T12. The terminal 6 receives registration screen data from the target SP server at T20, and displays a registration screen at T30.

The terminal 6 then receives inputs of various pieces of information at T32. The information varies depending on the service provided by the target SP server. In an example where the target SP server is the SP server 2A providing the automatic consumable shipping service, the information includes an email address MA, a password PW, an email address AD, and charging information CI such as a credit card number. In an example where the target SP server is the SP server 1A providing the remote printing service, the information includes the email address MA and the password PW (i.e., a user account), but does not include the email address AD and the charging information CI. The terminal 6 transmits the input information to the target SP server at T34. In a modification, for example, when the target SP server is the SP server 1A providing the remote printing service, the information input at T32 may include the email address AD and the charging information CI.

Upon receiving the information from the terminal 6 at T34, the target SP server enters a user account UA1 including the information (hereinafter simply referred to as "UA1") at T40. The target SP server then transmits an account request to the mediation server 10 at T50.

Upon receiving the account request from the target SP server at T50, the mediation server 10 generates a mediation server account SA1 (hereinafter simply referred to as "SA1") at T52. The mediation server 10 transmits SA1 to the target SP server at T54.

Upon receiving SA1 from the mediation server 10 at T54, the target SP server stores SA1 in association with UA1 at T56. Thus, SA1 is shared by the target SP server and the mediation server 10. The target SP server then transmits an account registration result indicating that UA1 has been registered to the terminal 6 at T60.

Upon receiving the account registration result from the target SP server at T60, the terminal 6 displays the account registration result at T62. The terminal 6 then receives a printer registration instruction performed by the user at T70. The terminal 6 transmits a printer registration request to the target SP server at T72. In a modification, the terminal 6 may transmit a printer registration request including UA1 to the target SP server at T72.

Upon receiving the printer registration request from the terminal 6 at T72, the target SP server transmits a PIN request including SA1 to the mediation server 10 at T74.

Upon receiving the PIN request from the target SP server at T74, the mediation server 10 generates a PIN code PC1 (hereinafter simply referred to as "PC1") at T76. The mediation server 10 then stores SA1 included in the PIN request and the generated PC1 in association with each other. The mediation server 10 transmits PC1 to the terminal 6 via the target SP server at T78.

Upon receiving PC1 from the target SP server at T78, the terminal 6 displays PC1 at T80. This allows the user to know PC1.

FIG. 4 Continued from FIG. 3

The printer 100 receives an input of PC1 performed by the user at T100. In this case, at T102, the printer 100 transmits a printer registration request including PC1 and the printer ID "PPP" (hereinafter simply referred to as "PPP") to the mediation server 10.

Upon receiving the printer registration request from the printer 100 at T102, the mediation server 10 identifies SA1 (refer to T76 in FIG. 3) associated with PC1 included in the printer registration request. Then, at T104, the mediation server 10 stores the identified SA1 and PPP included in the printer registration request in association with each other. Then, the mediation server 10 generates an access token AT1 (hereinafter simply referred to as "AT1") at T110, and stores AT1 in association with SA1 and PPP.

Then, the mediation server 10 transmits AT1 to the printer 100 at T112. As a result, an XMPP (abbreviation of Extensible Messaging and Presence Protocol) connection is established between the mediation server 10 and the printer 100 at T114. The use of the XMPP connection enables the mediation server 10 to transmit a signal to the printer 100 over the firewall of the LAN to which the printer 100 belongs without receiving a request from the printer 100. The mediation server 10 transmits notification information including SA1 and PPP to the target SP server at T120.

Upon receiving the notification information from the mediation server 10 at T120, the target SP server uses SA1 included in the notification information to confirm that UA1 and SA1 are associated with each other (refer to T56 in FIG. 3). The target SP server then stores PPP included in the notification information in association with UA1 and SA1 at T122. The target SP server then transmits, to the terminal 6, a printer registration result indicating that information of the printer 100 has been registered in the mediation server 10 at T130. The printer registration result includes PPP stored at T122 and one or more service IDs identifying one or more services that the target SP server can provide. In this embodiment, it is assumed that each of the SP servers 1A to 3C can provide only one service. Therefore, the printer registration result contains only one service ID corresponding to the target SP server.

Upon receiving the printer registration result from the target SP server at T130, the terminal 6 displays the printer registration result (that is, PPP and the service ID) at T132.

Service Registration Sequence: FIG. 4

At T140, the terminal 6 receives a selection of PPP and the service ID included in the printer registration result performed by the user. The terminal 6 transmits a service registration request including PPP and selected service ID to the target SP server at T142. In a modification, the terminal 6 may transmit the service registration request further including UA1 to the target SP server at T142.

Upon receiving the service registration request from the terminal 6 at T142, the target SP server identifies SA1 (refer to T122) associated with PPP included in the service registration request. The target SP server then transmits the service registration request further including SA1 to the mediation server 10 at T144.

Upon receiving the service registration request from the SP server at T144, the mediation server 10 performs a service registration process. The service registration process is a process for registering the printer ID, service ID, and service type in the registration management table 52.

Figure 5:
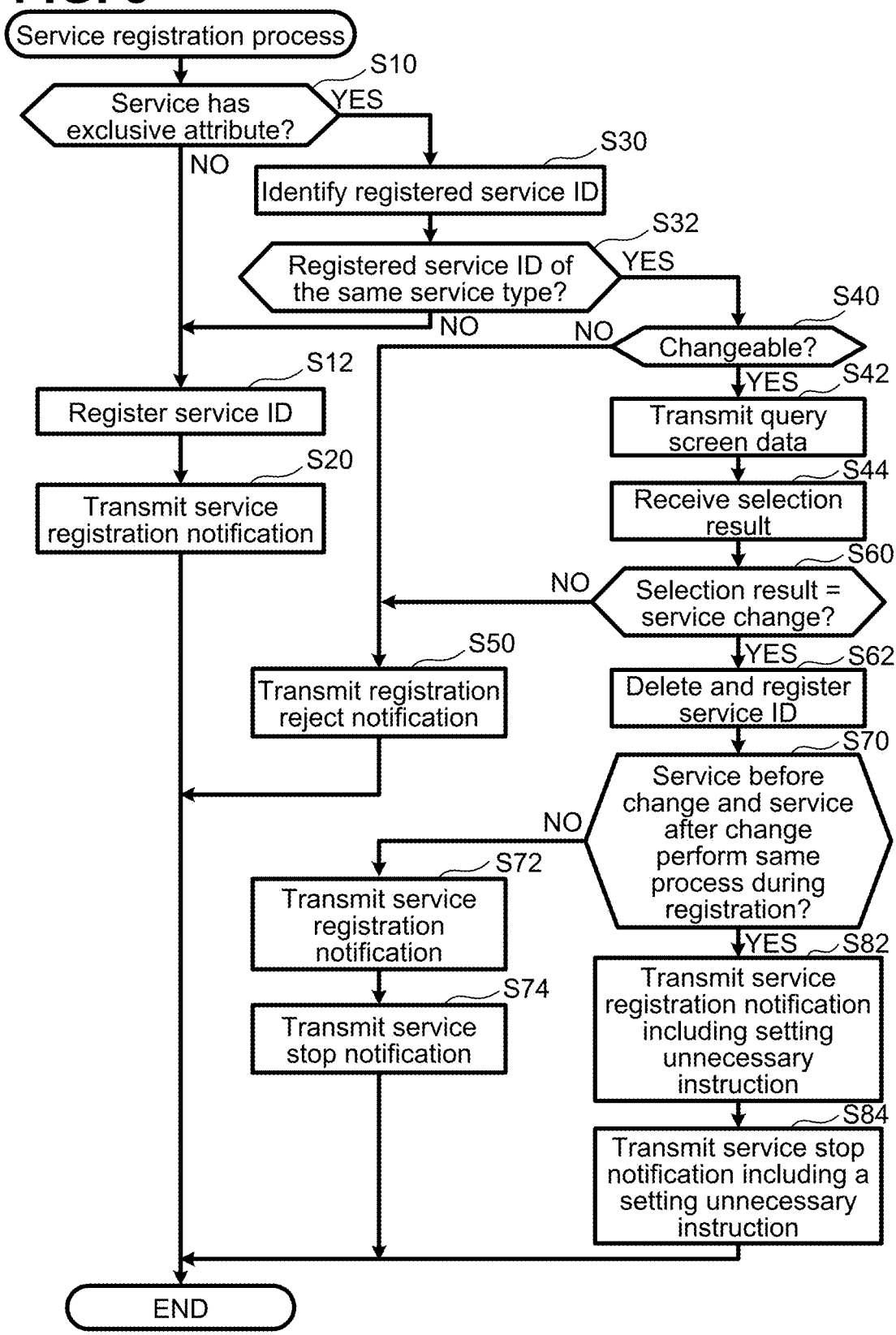
FIG. 5 is a flowchart of a service registration process.

Service Registration Process: FIG. 5

The service registration process performed by the CPU 32 of the mediation server 10 will be described with reference to FIG. 5. As described above, the service registration process is started by receiving a service registration request from the target SP server as a trigger. The service registration request includes a mediation server account, a printer ID, and a selected service ID.

In S10, the CPU 32 determines whether a service identified by the selected service ID has an exclusive attribute. Specifically, when the selected service ID and the exclusive attribute "YES" are associated with each other in the service type table 50, the CPU 32 determines that the service has the exclusive attribute (YES in S10) and the process proceeds to S30. In contrast, when the selected service ID and the exclusive attribute "NO" are associated with each other, the CPU 32 determines that the service does not have an exclusive attribute (NO in S10) and the process proceeds to S12.

In S12, the CPU 32 registers the selected service ID in the registration management table 52. Specifically, the CPU 32 identifies a service type associated with the selected service ID from the service type table 50. The CPU 32 then stores PPP, the selected service ID, which are included in the service registration request, and the identified service ID in the registration management table 52 in association with each other. When the CPU 32 ends step S12, the process proceeds to S20.

In S20, the CPU 32 transmits a service registration notification indicating that information such as a service ID has been registered to the target SP server. When step S20 ends, the processing of FIG. 5 ends.

In S30, the CPU 32 identifies more than one service ID (hereinafter referred to as "registered service ID") associated with PPP included in the service registration request from the registration management table 52. For no service ID associated with PPP, the CPU 32 does not identify a registered service ID.

In S32, the CPU 32 determines whether a service type of the registered service ID (hereinafter referred to as a "registered type") and a service type of the selected service ID (hereinafter referred to as a "selected type") coincide with each other. When the CPU 32 does not identify a registered service ID in S30, the CPU 32 determines "NO" in S32 and the process proceeds to S12. If one or more registered service IDs are identified in S30, the CPU 32 performs the following processing. That is, the CPU 32 identifies one or more registered types corresponding to one or more registered service IDs from the service type table 50, and identifies a selected type from the service type table 50. If the selected type is included in one or more registered types, the CPU 32 determines "YES" in S32 and the process proceeds to S40, and if the selected type is not included in one or more registered types, the CPU 32 determines "NO" in S32 and the process proceeds to S12.

Hereinafter, the registered service ID of the same service type as the selected service ID will be referred to as "specific service ID". In S40, the CPU 32 determines whether a service identified by the specific service ID (hereinafter referred to as a "specific service") is changeable to a service identified by the selected service ID (hereinafter referred to as a "selected service"). Specifically, the CPU 32 determines whether, in the change management table 54, the specific service ID is stored as a "service ID" and the selected service ID is stored as a "changeable service ID" associated with the specific service ID. If the selected service ID is stored in association with the specific service ID, the CPU 32 determines that a change from the specific service to the selected service is possible (YES in S40), and the process proceeds to S42. In contrast, if the selected service ID is not stored in association with the specific service ID, the CPU 32 determines that a change from the specific service to the selected service is impossible (NO in S40), and the process proceeds to S50.

In S50, the CPU 32 transmits a service registration notification indicating that information such as a service ID has been registered to the target SP server. When step S50 ends, the processing of FIG. 5 ends.

In S42, the CPU 32 transmits query screen data to the target SP server. The query screen data is data indicating a query screen for querying the user as to whether to change the specific service to the selected service. The query screen data is transmitted from the target SP server to the terminal 6, and the query screen is displayed on the terminal 6.

In S44, the CPU 32 receives a selection result on the query screen from the terminal 6 via the target SP server.

In S60, the CPU 32 determines whether the selection result indicates a "service change". If the selection result indicates a "service change", the CPU 32 determines "YES" in S60, and the process proceeds to S62. If the selection result does not indicate a "service change", the CPU 32 determines "NO" in S60, and the process proceeds to S50.

In S62, the CPU 32 deletes PPP, the specific service ID, which are included in the service registration request, and an associated service type, from the registration management table 52. The CPU 32 further stores PPP, the selected service ID, and the associated service type in the registration management table 52 in association with each other in the same manner as in S12. This enables a change of services of the same service type.

In S70, the CPU 32 determines whether a service before change (i.e., the specified service) and a service after change (i.e., the selected service) should perform the same process during registration. Specifically, the CPU 32 identifies a process during registration associated with the specific service ID from the change management table 54, and identifies a process during registration associated with the selected service ID. In a case where the two identified processes coincide with each other, the CPU 32 determines YES in S70 and the process proceeds to the S82. In a case where the two identified processes do not coincide with each other, the CPU 32 determines NO in S70 and the process proceeds to S72.

In S72, the CPU 32 transmits a service registration notification to the target SP server. In S74, the CPU 32 transmits a service stop notification for stopping providing a service to a SP server providing the specific service (hereinafter referred to as a "specific SP server"). When step S74 ends, the processing of FIG. 5 ends. In a modification, in S72, the CPU 32 may transmit a service registration notification including a setting necessary instruction to the target SP server. The setting necessary instruction is an instruction indicating that a process for changing the setting of the printer is necessary when service provision is started. In S74, the CPU 32 may transmit a service stop notification including a setting necessary instruction to a specific SP server. The setting necessary instruction is an instruction indicating that a process for changing the setting of the printer is necessary when service provision is stopped.

In S82, the CPU 32 transmits a service registration notification including a setting unnecessary instruction to the target SP server. The setting unnecessary instruction is an instruction indicating that a process for changing the setting of the printer is unnecessary when service provision is started. In S84, the CPU 32 transmits a service stop notification including a setting unnecessary instruction to the specific SP server. The setting unnecessary instruction is an instruction indicating that a process for changing the setting of the printer is unnecessary when service provision is stopped. When step S84 ends, the processing of FIG. 5 ends.

Figure 6:
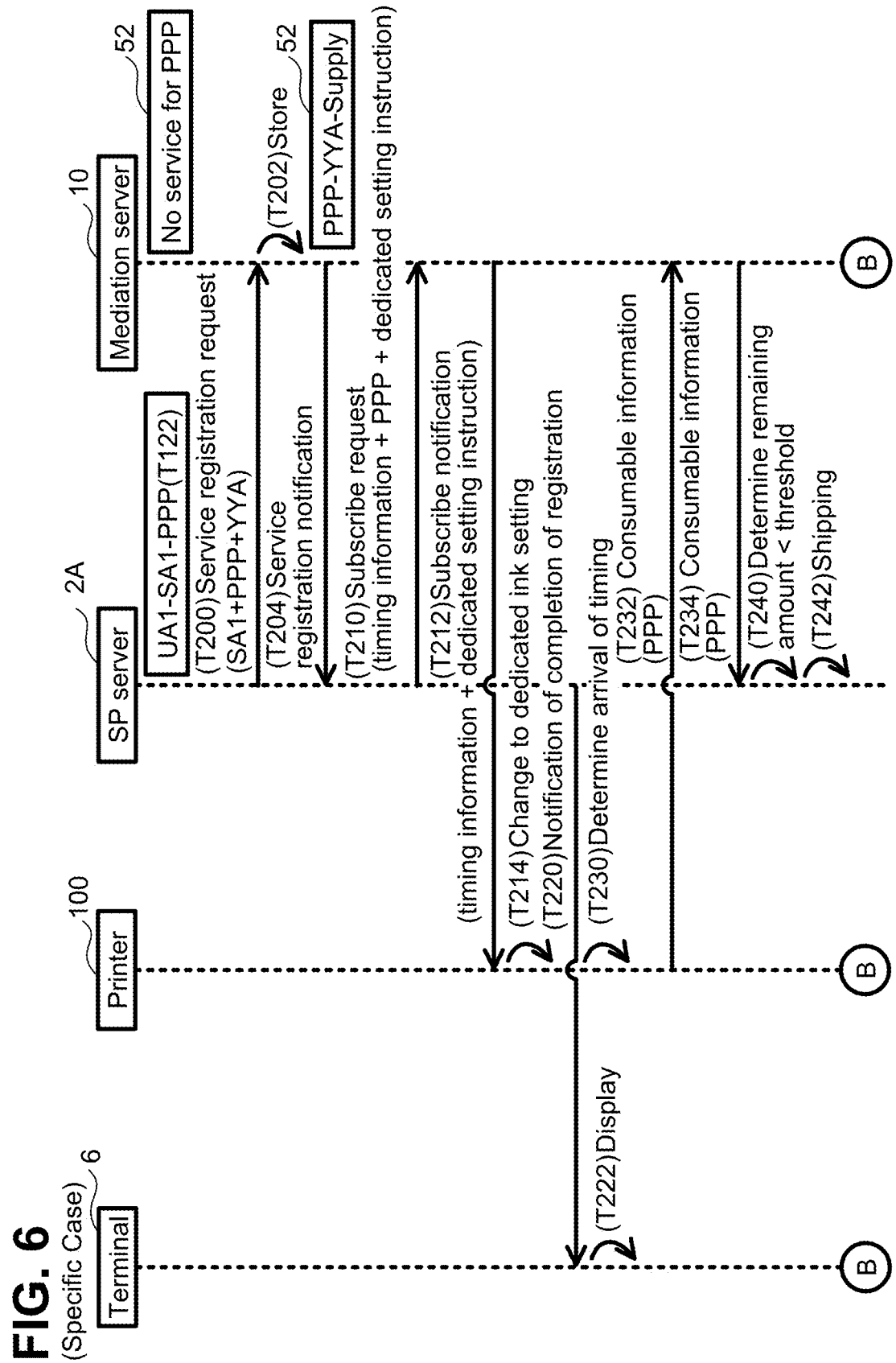
FIG. 6 is a sequence diagram of a specific case.

Specific Case: FIG. 6

A specific case performed by the processing of FIG. 5 will be described. FIG. 6 shows a case where the target SP server is the SP server 2A. In the initial state of FIG. 6, in the SP server 2A, UA1, SA1, and PPP are stored in association with each other (refer to T122 in FIG. 4). In the registration management table 52 of the mediation server 10, an association between PPP and the service ID is not created.

Upon receiving a service registration request including PPP and the service ID "YYA" from the terminal 6 at T142 in FIG. 4, the SP server 2A transmits a service registration request including SA1, PPP and the service ID "YYA" to the mediation server 10 at T200 in FIG. 6 (i.e., T144 in FIG. 4).

Upon receiving the service registration request from the SP server 2A at T200 (as a trigger of the processing of FIG. 5), the mediation server 10 uses the service type table 50 and determines that the service ID "YYA" included in the service registration request is associated with the exclusive attribute "YES" (YES at S10). The mediation server 10 uses the registration management table 52 and determines that no registered service ID is associated with PPP (NO in S32). The mediation server 10 thus stores PPP, the service ID "YYA", and type "Supply" in the registration management table 52 in association with each other at T202 (S12). The mediation server 10 then transmits a service registration notification to the SP server 2A at T204 (S20).

After the processing of FIG. 5, the SP server 2A performs a process to provide the automatic consumable shipping service, which will be described below. The SP server 2A transmits a Subscribe request to the mediation server 10 at T210. The Subscribe request includes timing information, PPP, and a dedicated setting instruction. The timing information indicates a time to transmit consumable information to the mediation server 10, for example, a predetermined time of day. The consumable information indicates the remaining amount of the color material in the CTG attached to the printer 100. The dedicated setting instruction is an instruction for changing the setting of the printer 100, specifically, an instruction to change the setting of the printer 100 from a setting in which the general-purpose CTG is available to a setting in which only the dedicated CTG is available (hereinafter referred to as a "dedicated ink setting"). The process in which the SP server 2A transmits a Subscribe request including a dedicated setting instruction to the mediation server 10 is the process during registration "dedicated ink setting" stored in the change management table 54.

Upon receiving the Subscribe request from the SP server 2A at T210, the mediation server 10 transmits the Subscribe request to the printer 100 at T212 by using the XMPP connection (refer to T144 in FIG. 4).

Upon receiving the Subscribe request at T212, the printer 100 changes the setting at T214 in accordance with the dedicated setting instruction. Specifically, the printer 100 changes the setting from the setting in which the general-purpose CTG is available to the dedicated ink setting in which only the dedicated CTG is available. As a result, the printer 100 can perform printing when the dedicated CTG is attached, but cannot perform printing when the general-purpose CTG is attached.

Upon receiving a notification of completion of registration from the SP server 2A at T220, the terminal 6 displays the notification of completion of registration at T222.

The printer 100 determines at T230 that the time indicated by the timing information included in the Subscribe request has arrived. In this case, the printer 100 transmits consumable information including PPP to the mediation server 10 at T232.

Upon receiving the consumable information from the printer 100 at T232, the mediation server 10 identifies service ID "YYA" (refer to T202) associated with PPP included in the consumable information from the registration management table 52. The mediation server 10 transmits the consumable information to the SP server 2A corresponding to the identified service ID "YYA" at T234.

Upon receiving the consumable information from the mediation server 10 at T234, the SP server 2A compares the remaining amount of the dedicated CTG included in the consumable information with the threshold value at T240. The SP server 2A determines that the remaining amount is less than the threshold value at T240, and performs a shipping process for shipping a new consumable (that is, a dedicated CTG) at T242. Specifically, the SP server 2A identifies UA1 associated with PPP included in the consumable information (refer to T122 in FIG. 4), and sends a consumable to the email address AD included in UA1. The SP server 2A then charges for payment by using the charging information CI included in UA1. The automatic consumable shipping service is thus performed.

Figure 7:
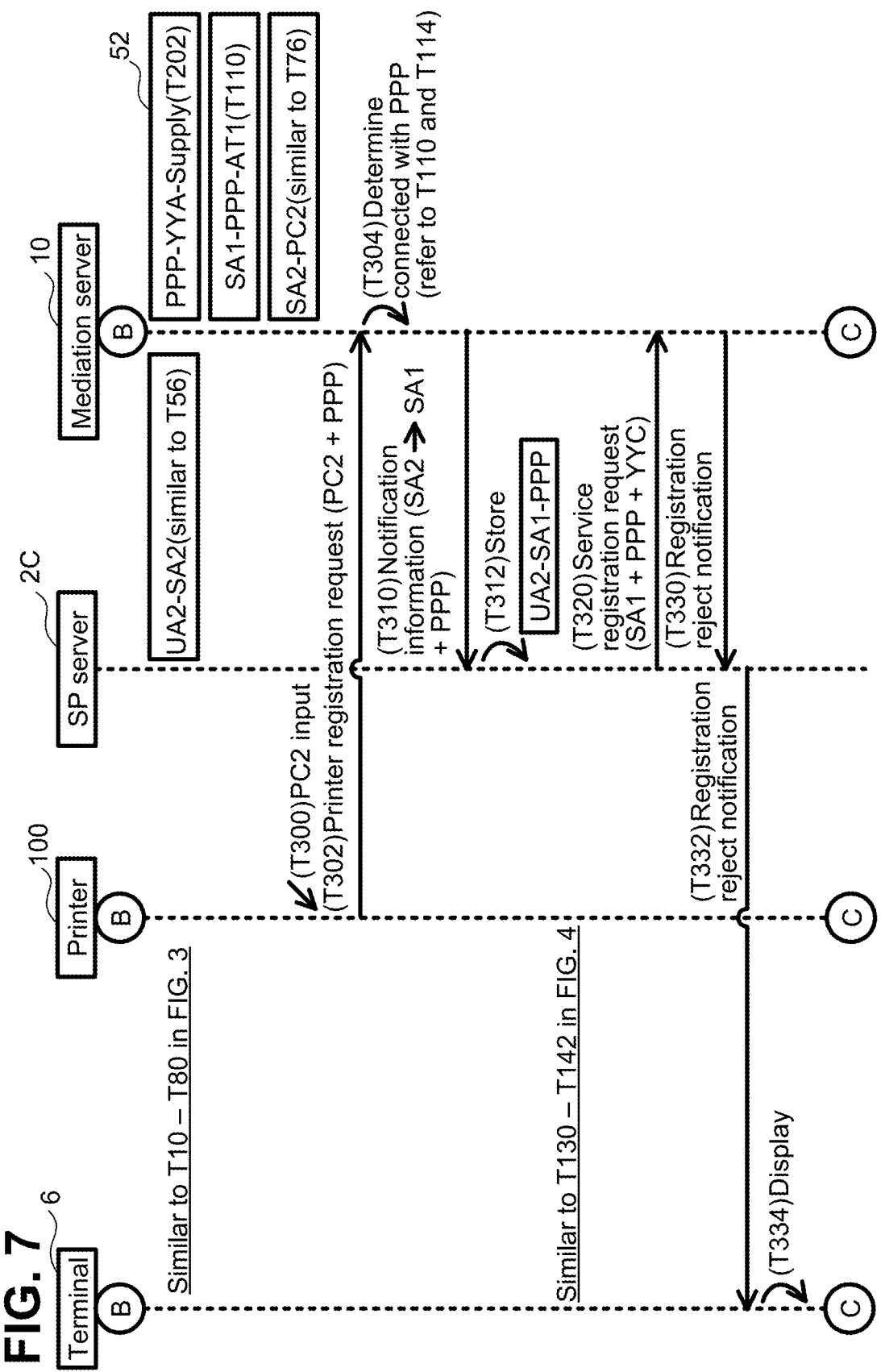
FIG. 7 is a sequence diagram continued from FIG. 6.

Case Continued from FIG. 6: FIG. 7

FIG. 7 is a sequence diagram continued from FIG. 6. FIG. 7 shows a case where the target SP server is the SP server 2C. In the initial state of FIG. 7, in the registration management table 52 of the mediation server 10, PPP, YYA, and type "Supply" are stored in association with each other (refer to T202 in FIG. 6). In the mediation server 10, SA1, PPP, and AT1 are stored in association with each other (refer to T110 in FIG. 4).

A sequence of processing steps similar to those at T10 to T80 in FIG. 3 is performed. Here, however, a user account UA2 (hereinafter simply referred to as "UA2") is used instead of UA1. As a result, the SP server 2C stores UA2 and the mediation server account SA2 (hereinafter simply referred to as "SA2") in association with each other, as in the case of T56 in FIG. 3. Similarly to T76, the mediation server 10 generates a PIN code PC2 (hereinafter simply referred to as "PC2"), and stores SA2 and PC2 in association with each other.

The printer 100 receives an input of PC2 displayed on the terminal 6 from the user at T300. In this case, at T302, the printer 100 transmits a printer registration request including PC2 and PPP to the mediation server 10.

Upon receiving the printer registration request from the printer 100 at T302, the mediation server 10 determines that an XMPP connection with the printer 100 identified by PPP has been established at T304, as PPP included in the printer registration request is stored in association with AT1. Thus, the mediation server 10 does not perform the processing at T104 to T114 in FIG. 4.

The mediation server 10 then identifies SA1 stored in association with PPP included in the printer registration request and identifies SA2 stored in association with PC2 included in the printer registration request. The mediation server 10 transmits notification information including an account change instruction and PPP to the SP server 2C at T310. The account change instruction indicates an instruction to change the mediation server account stored in the SP server 2C from SA2 to SA1.

Upon receiving the notification information from the mediation server 10 at T310, the SP server 2C changes the mediation server account from SA2 to SA1 in accordance with the account change instruction included in the notification information at T312. At T312, the SP server 2C further stores PPP included in the notification information in association with UA2 and SA1.

A sequence of processing steps similar to those at T130 to T142 in FIG. 4 is performed. Here, however, UA2 is used instead of UA1. Upon receiving a service registration request including PPP and the service ID "YYC" from the terminal 6 at T142 in FIG. 4, the SP server 2C transmits a service registration request including SA1, PPP and the service ID "YYC" to the mediation server 10 at T320 in FIG. 7 (i.e., T144 in FIG. 4).

Upon receiving the service registration request from the SP server 2C at T320 (as a trigger of the processing of FIG. 5), the mediation server 10 uses the service type table 50 and determines that the service ID "YYC" included in the service registration request is associated with the exclusive attribute "YES" (YES at S10). The mediation server 10 uses the registration management table 52 and determines that the registered service ID "YYA" having the same service type "Supply" as the service ID "YYC" is associated with PPP (YES in S32). In the change management table 54, the service ID "YYC" is not stored as a changeable service ID associated with the registered service ID "YYA". The mediation server 10 thus determines that a change from the service "YYA" to the service "YYC" is impossible (NO in S40), and transmits, to the SP server 2C, a registration reject notification indicating that information such as the service ID "YYC" has not been registered at T330 (S50). As a result, at T332, the SP server 2C transmits the registration reject notification to the terminal 6, and at T334, the registration reject notification is displayed at the terminal 6.

As described above, the mediation server 10 uses the transition management table 54, determines that the change from the service "YYA" to the service "YYC" is impossible, and does not register the service ID "YYC" in association with PPP. This prevents inappropriate service changes.

Figure 8:
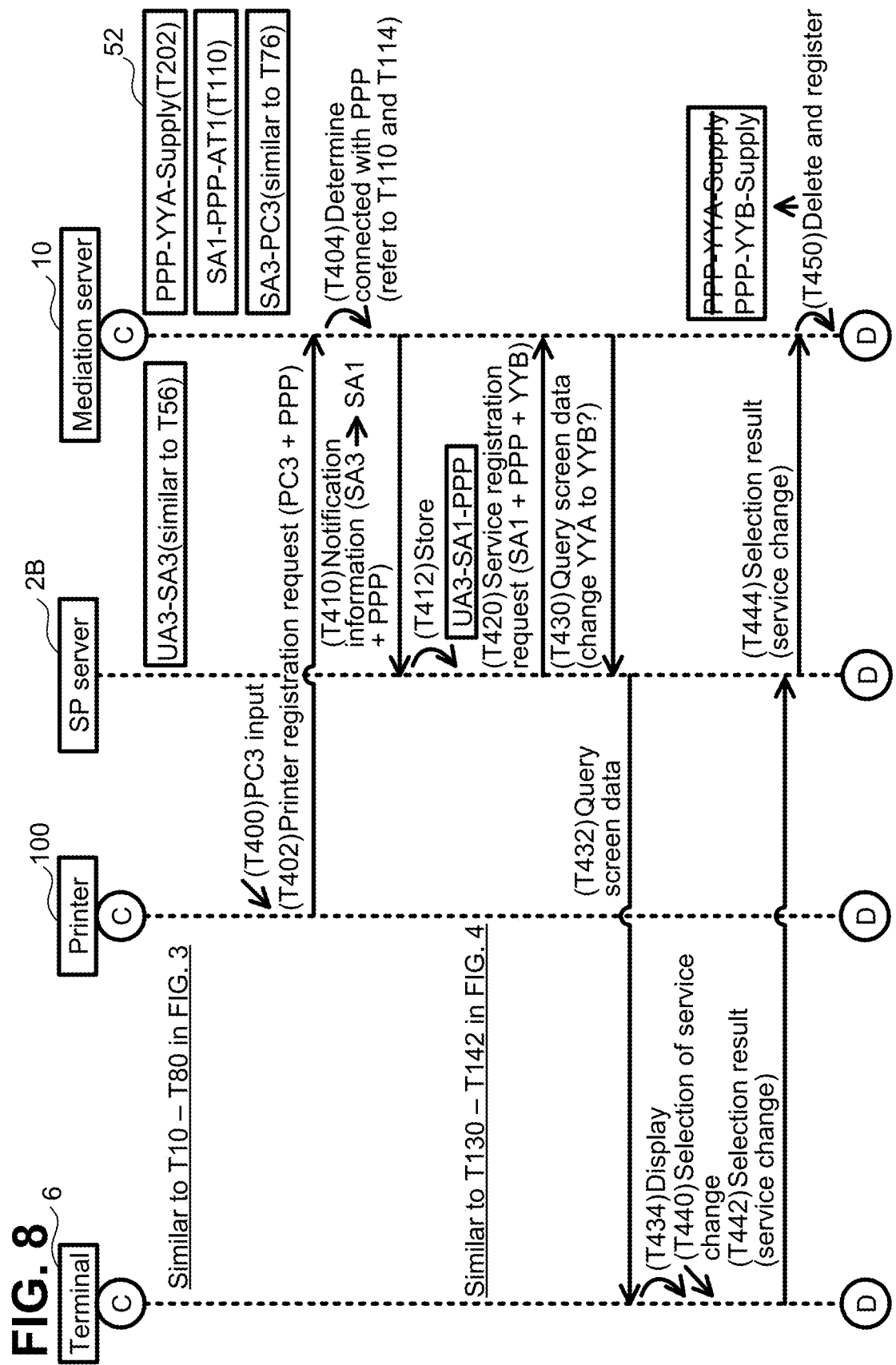
FIG. 8 is a sequence diagram continued from FIG. 7.

Specific Case: FIG. 8

FIG. 8 is a sequence diagram continued from FIG. 7. FIG. 8 shows a case where the target SP server is the SP server 2B. The initial state of FIG. 8 is the same as that of FIG. 7.

A sequence of processing steps similar to those at T10 to T80 in FIG. 3 is performed. Here, however, a user account UA3 (hereinafter simply referred to as "UA3") is used instead of UA1. As a result, the SP server 2B stores UA3 and the mediation server account SA3 (hereinafter simply referred to as "SA3") in association with each other, as in the case of T56 in FIG. 3. Similarly to T76, the mediation server 10 generates a PIN code PC3 (hereinafter simply referred to as "PC3"), and stores SA3 and PC3 in association with each other.

A sequence of processing steps at T400 to T420 is similar to those at T300 to T320 in FIG. 7 except that UA3, SA3, and PC3 are used. Upon receiving the service registration request from the SP server 2B at T420 (as a trigger of the processing of FIG. 5), the mediation server 10 uses the service type table 50 and determines that the service ID "YYB" included in the service registration request is associated with the exclusive attribute "YES" (YES at S10). The mediation server 10 uses the registration management table 52 and determines that the registered service ID "YYA" having the same service type "Supply" as that of the service ID "YYB" is associated with PPP (YES in S32). In the change management table 54, the service ID "YYB" is stored as a changeable service ID associated with the registered service ID "YYA". The mediation server 10 thus determines that a change from the service "YYA" to the service "YYB" is possible (YES in S40). The mediation server 10 transmits query screen data to the terminal 6 via the SP server 2B at T430 (S42).

Upon receiving the query screen data from the SP server 2B at T432, the terminal 6 displays a query screen at T434. The terminal 6 receives a selection of "service change" performed by the user at T440. In this case, the terminal 6 transmits a selection result indicating "service change" to the mediation server 10 via the SP server 2B at T442.

Upon receiving the selection result from the SP server 2B at T444 (YES at S60), the mediation server 10 deletes the service ID "YYA" associated with PPP in the registration management table 52, and registers PPP, the service ID "YYB", and type "Supply" in association with each other at T450 (S62).

As described above, the mediation server 10 transmits the query screen data to the terminal 6, and determines whether to change the service in accordance with the selection result of the user. This prevents the execution of service change which is not intended by the user.

Figure 9:
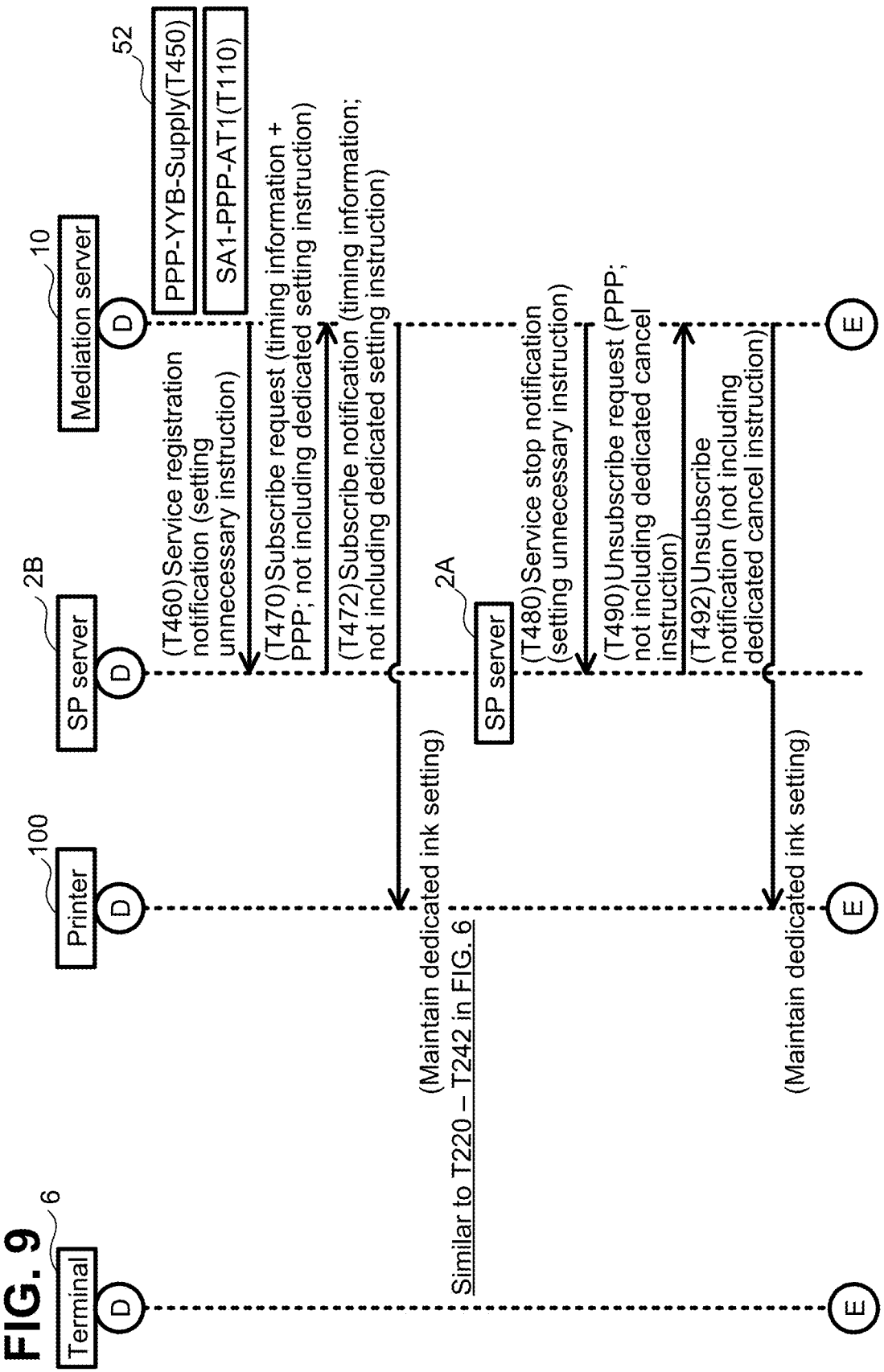
FIG. 9 is a sequence diagram continued from FIG. 8.

Case Continued from FIG. 8: FIG. 9

FIG. 9 is a sequence diagram continued from FIG. 8. The mediation server 10 uses the transition management table 54 and determines that the service ID "YYA" and the service ID "YYB" are associated with the same process during registration "dedicated ink setting" (YES in S70). The mediation server 10 thus transmits a service registration notification including a setting unnecessary instruction to the SP server 2B at T460 (S82).

Upon receiving the service registration notification from the mediation server 10 at T460, the SP server 2B transmits a Subscribe request to the mediation server 10 at T470. The Subscribe request includes timing information and PPP, and does not include a dedicated setting instruction.

Upon receiving the Subscribe request from the SP server 2B at T470, the mediation server 10 transmits the Subscribe request to the printer 100 at T472 by using the XMPP connection (refer to T144 in FIG. 4). As a result, the printer 100 maintains the dedicated ink setting set at T214 in FIG. 6. A sequence of processing steps similar to those at T220 to T242 in FIG. 6 is performed, and the SP server 2B performs automatic consumable shipping service.

The mediation server 10 thus transmits a service stop notification including a setting unnecessary instruction to the SP server 2B at T480 (S84). This enables the mediation server 10 to stop the automatic consumable shipping service provided by the SP server 2A.

Upon receiving the service stop notification from the mediation server 10 at T480, the SP server 2A transmits an Unsubscribe request to the mediation server 10 at T490. The Unsubscribe request includes PPP. Here, the Unsubscribe request does not include a dedicated cancel instruction for canceling the dedicated ink setting of the printer 100.

Upon receiving the Unsubscribe request from the SP server 2A at T490, the mediation server 10 transmits the Unsubscribe request to the printer 100 at T492 by using the XMPP connection (refer to T144 in FIG. 4). Since the Unsubscribe request does not include a dedicated cancel instruction, the printer 100 maintains the dedicated ink setting.

As described above, when the service ID "YYA" and the service ID "YYB" include the same process during registration "dedicated ink setting", the mediation server 10 transmits a setting unnecessary instruction to the SP servers 2B and 2A. This prevents unnecessary processing in which the SP server 2A before the change causes the printer 100 to cancel the dedicated ink setting and the SP server 2B after the change causes the printer 100 to perform the dedicated ink setting.

Figure 10:
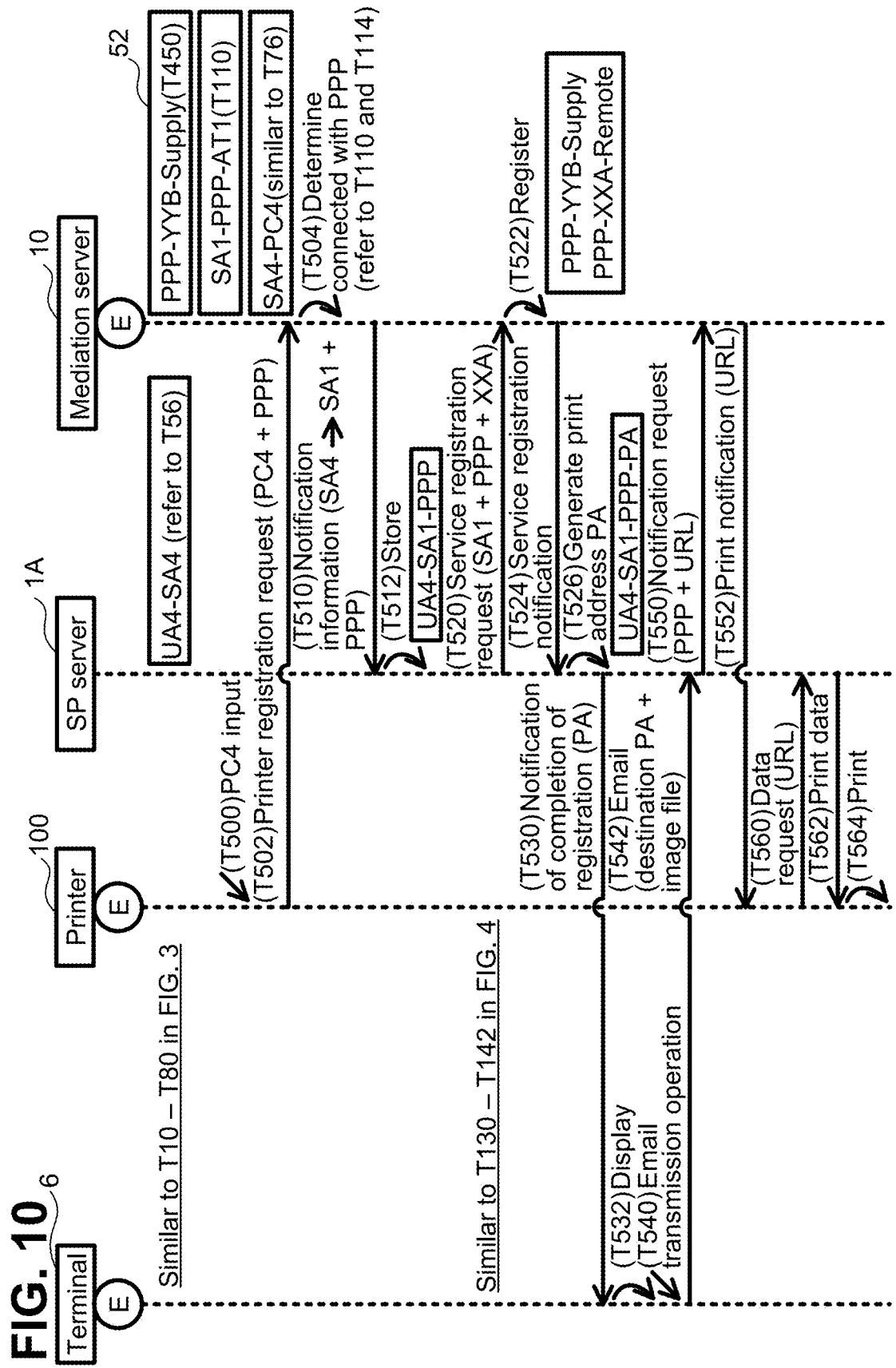
FIG. 10 is a sequence diagram continued from FIG. 9.

Case Continued from FIG. 9: FIG. 10

FIG. 10 is a sequence diagram continued from FIG. 9. FIG. 10 shows a case where the target SP server is the SP server 1A. In the initial state of FIG. 10, in the registration management table 52 of the mediation server 10, PPP, YYB, and type "Supply" are stored in association with each other (refer to T450 in FIG. 9).

A sequence of processing steps similar to those at T10 to T80 in FIG. 3 is performed. Here, however, a user account UA4 (hereinafter simply referred to as "UA4") is used instead of UA1. As a result, the SP server 1A stores UA4 and the mediation server account SA4 (hereinafter simply referred to as "SA4") in association with each other, as in the case of T56 in FIG. 3. Similarly to T76, the mediation server 10 generates a PIN code PC4 (hereinafter simply referred to as "PC4"), and stores SA4 and PC4 in association with each other.

A sequence of processing steps at T500 to T520 is similar to those at T300 to T320 in FIG. 7 except that UA4 is used instead of UA2. Upon receiving the service registration request from the SP server 1A at T520 (as a trigger of the processing of FIG. 5), the mediation server 10 uses the service type table 50 and determines that the service ID "XXA" included in the service registration request is not associated with the exclusive attribute "YES" (NO at S10). The mediation server 10 thus stores PPP, the service ID "XXA", and type "Remote" in the registration management table 52 in association with each other at T522 (S12). The mediation server 10 then transmits a service registration notification to the SP server 1A at T524 (S20).

Service of type "Remote" does not have an exclusive attribute. Thus, even if PPP is stored in association with the service ID "XXB" in the registration management table 52, PPP is further stored in association with the service ID "XXA". If the registration of the service "ZZA" of type "Warranty" is required, the service ID "ZZA" is stored unless another service "ZZB" of type "Warranty" is stored in association with PPP. In contrast, if the other service "ZZB" of type "Warranty" is stored in association with PPP, the service ID "ZZA" is not stored.

Next, a process in which the SP server 1A provides the remote printing service will be described. At T526, the SP server 1A generates a print address PA (hereinafter referred to as "PA") which is an email address for causing the printer 100 to perform printing, and stores PA in association with UA4, SA1, and PPP. The SP server 1A then transmits a notification of completion of registration including PA to the terminal 6 at T530.

Upon receiving PA from the SP server 1A at T530, the terminal 6 displays PA at T532. This allows the user to know PA. The terminal 6 then receives an email transmission operation performed by the user at T540. The email transmission operation includes an input of PA as a destination address and selection of an image file representing an image to be printed. In this case, the terminal 6 transmits an email including PA and the image file to the SP server 1A at T542.

Upon receiving the email at T542, the SP server 1A identifies PPP (refer to T526) associated with PA included in the email. The SP server 1A then converts the image file included in the email and generates print data having a print format that can be interpreted by the printer 100. The SP server 1A transmits a notification request including the identified PPP and a URL of the print data to the mediation server 10 at T550.

Upon receiving the notification request from the SP server 1A at T550, the mediation server 10 identifies the printer 100 from PPP included in the notification request, and transmits a print notification including the URL to the identified printer 100 using the XMPP connection (refer to T144 in FIG. 4) at T552.

Upon receiving the print notification from the mediation server 10 at T552, the printer 100 transmits a data request including the URL included in the print notification to the SP server 1A at T560.

Upon receiving the data request from the printer 100 at T560, the SP server 1A transmits print data indicated by the URL included in the data request to the printer 100 at T562. The remote printing service is thus performed.

Figure 11:
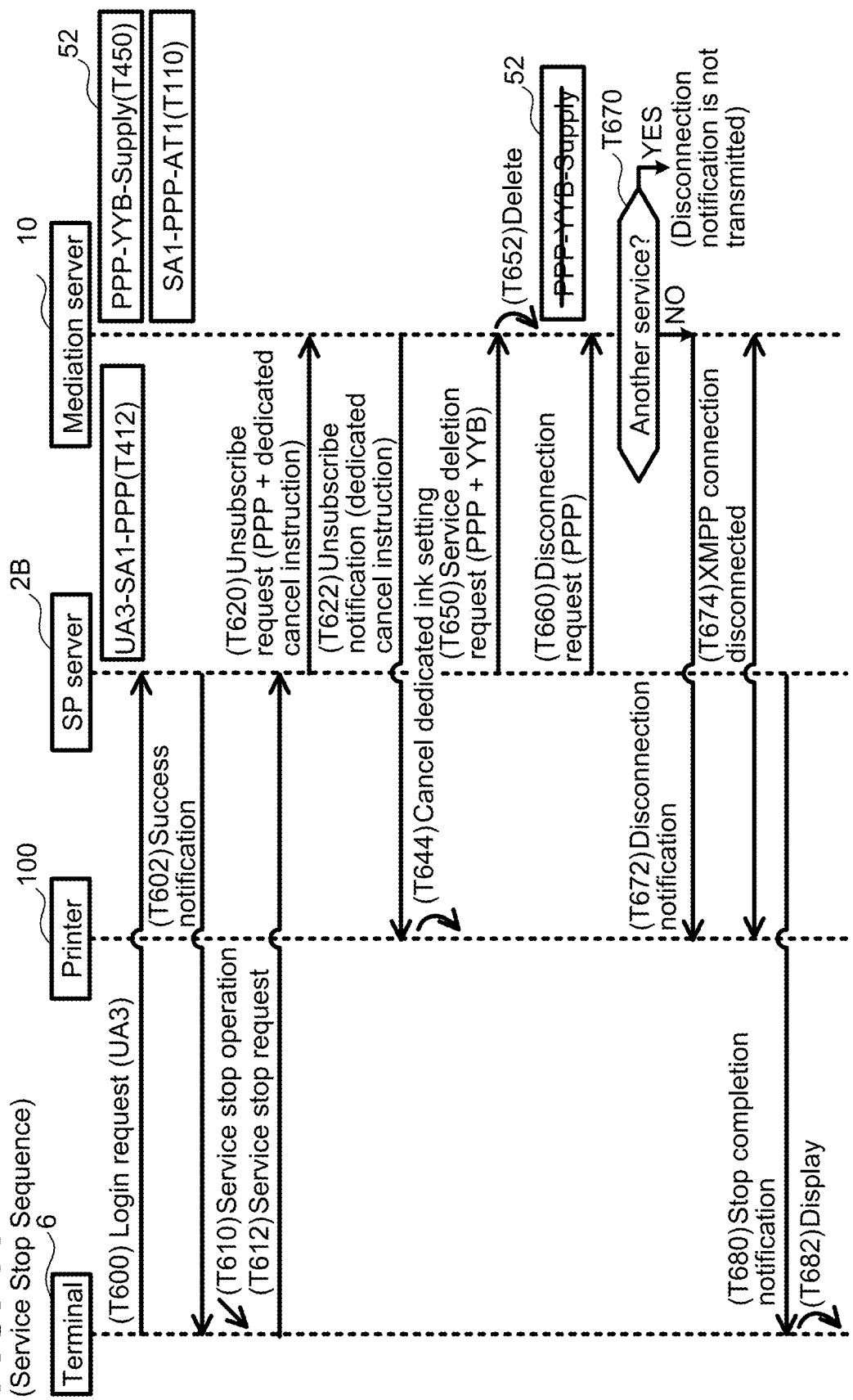
FIG. 11 is a sequence diagram for service stop.

Service Stop Sequence: FIG. 11

With reference to FIG. 11, a process for stopping a service will be described. In FIG. 11, the service "YYB" provided by the SP server 2B is stopped. In the initial state of FIG. 11, in the SP server 2B, UA3, SA1, and PPP are stored in association with each other (refer to T412 in FIG. 8). In the registration management table 52 of the mediation server 10, PPP, YYB, and type "Supply" are stored in association with each other (refer to T450 in FIG. 9). In the mediation server 10, SA1, PPP, and AT1 are stored in association with each other (refer to T110 in FIG. 4).

Upon receiving a login operation performed by the user, the terminal 6 transmits a login request including UA3 to the SP server 2B at T600, and receives a success notification indicating that the login was successful from the SP server 2B at T602. At T610, the terminal 6 receives a service stop operation requesting to stop the service "YYB", which is performed by the user. In this case, the terminal 6 transmits a service stop request to the SP server 2B at T612. In a modification, the service stop request may include UA3, PPP and YYB.

Upon receiving the service stop request from the terminal 6 at T612, the SP server 2B identifies PPP associated with the logged-in UA3. The SP server 2B then transmits an Unsubscribe request including PPP and a dedicated cancel instruction to the mediation server 10 at T620. The dedicated cancel instruction is an instruction for canceling the dedicated ink setting of the printer 100.

Upon receiving the Unsubscribe request from the SP server 2B at T620, the mediation server 10 transmits an Unsubscribe notification including the dedicated cancel instruction to the printer 100 at T622.

Upon receiving the Unsubscribe notification from the mediation server 10 at T622, the printer 100 cancels the dedicated ink setting in accordance with the dedicated cancel instruction included in the Unsubscribe notification at T644. The printer 100 further stops periodically transmitting the consumable information to the mediation server 10.

The SP server 2B transmits a service deletion request including PPP and the service ID "YYB" to the mediation server 10 at T650.

Upon receiving the service deletion request from the SP server 2B at T650, the mediation server 10 deletes PPP and YYB included in the service deletion request from the registration management table 52 at T652.

The SP server 2B then transmits a disconnection request including PPP to the mediation server 10 at T660. The disconnection request is information for requesting to disconnect the XMMP connection (refer to T144 in FIG. 4) between the mediation server 10 and the printer 100.

Upon receiving the disconnection request from the SP server 2B at T660, the mediation server 10 determines whether another service ID associated with PPP included in the disconnection request is in the registration management table 52 at T670. In response to determining that there is no other service (NO at T670), the mediation server 10 transmits a disconnection notification to the printer 100. Thus, the XMPP connection between the mediation server 10 and the printer 100 is disconnected at T674. In contrast, in response to determining that there is another service (YES at T670), the mediation server 10 does not transmit a disconnection notification to the printer 100. The mediation server 10 can thus avoid the occurrence of an event in which the mediation server 10 becomes unable to communicate with the printer 100 to perform the other service, due to disconnection of the XMMP connection.

The SP server 2B then transmits, to the terminal 6, a stop completion notification indicating that the registration of the service "YYB" has been stopped at T680. Thus, at T682, the terminal 6 displays the fact that the registration of the service "YYB" has been stopped.

Effects of Embodiment

According to this embodiment, when the service requested to be registered by the user is the service "XXA" of type "Remote" which does not have an exclusive attribute (T520 in FIG. 10), the mediation server 10 determines that the service "XXA" can be provided even if another service "XXB" of type "Remote" has been already registered in the registration management table 52 in association with the printer 100 (NO in S10 in FIG. 5). In this case, the mediation server 10 stores PPP and the service ID "XXA" in the registration management table 52 in association with each other (T522 in FIG. 10). In contrast, when the service requested to be registered by the user is the service "YYC" of type "Supply" having an exclusive attribute (T320 in FIG. 7), the mediation server 10 determines that the service "YYC" cannot be provided if another service "YYA" of type "Supply" has been already registered in the registration management table 52 in association with the printer 100 (YES in S10, YES in S32, NO in S40 in FIG. 5). The mediation server 10 can change whether to simultaneously provide two or more services of the same service type to the user via the same printer in accordance with the service type for which registration is requested.

Correspondence Relationship

The mediation server 10 is an example of a "server", the printer 100 is an example of a "specific communication device", and PPP is an example of "specific device identification information". The service providing servers 1A to 3B are each an example of an "external device". The remote printing service is an example of a "first type of service", the automatic consumable shipping service is an example of a "second type of service", and the product warranty service is an example of a "third type of service". In the example in FIG. 7, the service ID "YYC" is an example of "first service identification information", and the service ID "YYA" is an example of "second service identification information". In the example in FIG. 8, the service ID "YYB" is an example of "first service identification information", and the service ID "YYA" is an example of "second service identification information". The service ID "YYB" stored as the changeable service ID is an example of "changeable service identification information". The setting in which the general-purpose CTG is available is an example of a "first setting", and the dedicated ink setting is an example of a "second setting".

The processing at T144 in FIG. 4, T200, T320, T420, and T520 is an example of processing performed by a "registration request receiver". The processing at S10 in FIGS. 5, S32, and S40 is an example of processing performed by a "first determiner". The processing in S12 and S62 is an example of processing performed by a "first memory controller". The processing in S42 in FIG. 5 and at T430 in FIG. 8 is an example of processing performed by a "screen data transmitter". The processing at S84 in FIG. 5 and T480 in FIG. 9 is an example of processing performed by a "first notification provider". The processing at S82 in FIG. 5 and T460 in FIG. 9 is an example of processing performed by a "second notification provider". Transmission of the dedicated setting instruction at T210 in FIG. 6 is an example of the "first change processing". Transmission of the dedicated cancel instruction at T620 in FIG. 11 is an example of the "second change processing".

Although specific examples of the disclosure have been described in detail above, these are merely examples and do not limit the scope of the claims. The technology described in the claims includes various modifications and changes of the specific examples illustrated above. Modifications of the above embodiment are enumerated below.

In a first modification, instead of a service registration request from the SP server 1A or the like (T144 in FIG. 4) in the embodiment, the mediation server 10 may receive a registration request from the terminal 6 or a service registration request from the printer 100. In this modification, the terminal 6 or the printer 100 is an example of an "external device".

In a second modification, the mediation server 10 may receive a service registration request not including PPP from the SP server 1A or the like at T144 in FIG. 4. In this case, the mediation server 10 identifies PPP from SA1 included in the service registration request, and performs the processing of FIG. 5 by using the identified PPP. In this modification, the mediation server account SA1 is an example of "specific device identification information".

In a third modification, at T210 in FIG. 6, the SP server 2A may cause the terminal 6 or the printer 100 to display a screen indicating to change the setting to the dedicated ink setting, instead of transmitting the dedicated setting instruction. At T620 in FIG. 11, the SP server 2B may cause the terminal 6 or the printer 100 to display a screen indicating to cancel the dedicated ink setting, instead of transmitting the dedicated cancel instruction. In this modification, the processing for displaying the former screen is an example of "first change processing", and the processing for displaying the latter screen is an example of "second change processing".

In a fourth modification, the service type table 50 may not include a service ID. In this case, at T144 in FIG. 4, the mediation server 10 receives the service registration request further including the service type from the SP server 1A or the like and performs the processing of FIG. 5 using the service type.

In a fifth modification, the mediation server 10 may not store the change management table 54. In this case, if the result of S32 in FIG. 5 is YES, the process may proceed to S50. That is, steps S40 to S44 and S60 to S84 are omitted. In general terms, "memory" need not store changeable service identification information.

In a sixth modification, steps S42, S44, and S60 in FIG. 5 can be omitted. In this modification, the "screen data transmitter" can be omitted.

In a seventh modification, steps S72, S74, S82, and S84 in FIG. 5 can be omitted. In this modification, the "first notification provider" and the "second notification provider" can be omitted.

In an eighth modification, upon receiving the disconnection request at T660 in FIG. 11, the mediation server 10 may disconnect the XMPP connection regardless of whether there is any other service associated with PPP. That is, the processing at T670 in FIG. 11 can be omitted. In this modification, the "second determiner" and the "disconnector" can be omitted.

In a ninth modification, the SP servers 3A and 3B can be omitted. That is, the "third type of service" can be omitted.

In a tenth modification, UA1 to UA4 may all be the same user account, some of them may be the same user account, or all of them may be different user accounts.

In an eleventh modification, at least one of the processes in FIGS. 3 to 11 performed using software in the embodiment described above may be performed using hardware such as a logic circuit.

The technical elements described in this specification or the drawings each exhibit technical effects separately or in combination, and combinations of the elements are not limited to those described in the claims as filed. The techniques illustrated in the specification or the drawings may achieve a plurality of purposes at a time, and achieving one of the purposes may produce technical effects.

What is claimed is:

1. A server, comprising:
a processor; and
memory configured to store device identification information and service identification information in association with each other, the device identification information identifying a communication device among one or more communication devices, the service identification information identifying a service currently provided to a user of the communication device among a plurality of services, wherein the plurality of services include a first type of service having no exclusive attribute and a second type of service having the exclusive attribute, and wherein the exclusive attribute indicates that, in a state where a certain type of service is provided to a user of a certain communication device, another service of the certain type is not provided to the user of the certain communication device, the memory storing instructions, when executed by the processor, causing the server to perform;
receiving, from an external device, a registration request including first service identification information and specific device identification information, the first service identification information identifying a first service to be provided to a user of a specific communication device, the specific device identification information identifying the specific communication device;
a first determination comprising:
in response to the registration request received from the external device, determining whether to provide the first service to the user of the specific communication device;
in response to the first service being the first type of service having no exclusive attribute, determining to provide the first service regardless of whether the specific device identification information is stored in association with service identification information different from the first service identification information in the memory;
determining to provide the first service in response to the first service being the second type of service having the exclusive attribute and the specific device identification information being not stored in association with service identification information identifying the second type of service different from the first service in the memory; and
determining not to provide the first service in a specific case where the first service is the second type of service having the exclusive attribute and the specific device identification information is stored in association with second service identification information in the memory, the second service identification information identifying a second service that is the second type of service different from the first service; and
a first memory control comprising, in response to a determination to provide the first service, storing the first service identification information in the memory in association with the specific device identification information.

2. The server according to claim 1,
wherein the memory is further configured to store the second service identification information and changeable service identification information in association with each other, the second service identification information identifying the second type of service among one or more second type of services, the changeable service identification information identifying a changeable service that is another second type of service being changeable from the second type of service, and
wherein the instructions, when executed by the processor further cause the server to perform in the first determination:
determining not to provide the first service in a case where, in the specific case, the second service identification information and the first service identification information that is the changeable service identification information are not stored in association with each other; and
determining to provide the first service in a case where, in the specific case, the second service identification information and the first service identification information that is the changeable service identification information are stored in association with each other.

3. The server according to claim 2, wherein the memory further stores instructions, when executed by the processor, causing the server to perform:

transmitting query screen data for displaying a query screen to the external device in response to a determination to provide the first service because the second service identification information and the first service identification information that is the changeable service identification information are stored in association with each other, wherein the query screen is a screen for querying the user of the specific communication device as to whether to change the second service to the first service, wherein the instructions, when executed by the processor, further cause the server to in the first memory control:

storing the first service identification information in the memory in association with the specific device identification information in response to a selection to change the second service to the first service on the query screen; and not storing the first service identification information in the memory in response to a selection not to change the second service to the first service on the query screen.

4. The server according to claim 2, wherein the memory further stores instructions, when executed by the processor, causing the server to perform:

a first notification comprising notifying a second service providing server providing the second service to stop providing the second service to the user of the specific communication device in response to a determination to provide the first service because the second service identification information and the first service identification information that is the changeable service identification information are stored in association with each other.

5. The server according to claim 4, wherein the second service providing server and a first service providing server providing the first service are each configured to:

perform first change processing for changing a setting of the specific communication device from a first setting to a second setting upon starting to provide a service to the user of the specific communication device; and perform second change processing for changing the setting of the specific communication device from the second setting to the first setting upon stopping providing a service to the user of the specific communication device; and wherein the memory further stores instructions, when executed by the processor, causing the server to perform:

a second notification comprising notifying the first service providing server that the first change processing is unnecessary in response to a determination to provide the first service because the second service identification information and the first service identification information that is the changeable service identification information are stored in association with each other, and wherein the first notification comprising notifying the second service providing server that the second change processing is unnecessary.

6. The server according to claim 1, wherein the memory further stores instructions, when executed by the processor, causing the server to perform:

establishing a continuous connection with the specific communication device, the continuous connection being a connection to perform, with the specific communication device, communication related to provision of a service to the user of the specific communication device;

receiving a deletion request from the external device, the deletion request including the first service identification information and the specific device identification information stored in the memory in association with each other; and a second memory control comprising, in response to the deletion request received from the external device, deleting the first service identification information associated with the specific device identification information from the memory; and a second determination comprising:

in response to the deletion request received from the external device, determining whether different service identification information different from the first service identification information is stored in association with the specific device identification information in the memory; and disconnecting the continuous connection with the specific communication device in response to a determination that the different service identification information is not stored in association with the specific device identification information in the memory, the disconnecting being not to disconnect the continuous connection with the specific communication device in response to that a determination that the different service identification information is stored in association with the specific device identification information in the memory.

7. The server according to claim 1, wherein the plurality of services further include a third type of service having the exclusive attribute, the third type of service being different from the second type of service, and wherein the instructions, when executed by the processor, further cause the server to in the first determination to perform:

determining to provide the first service in response to the first service being the third type service having the exclusive attribute and the specific device identification information and service identification information identifying the third type service different from the first service being not stored in association with each other in the memory; and determining not to provide the first service in response to the first service being the third type service having the exclusive attribute and the specific device identification information and the service identification information identifying the third type service being stored in association with each other in the memory.

8. A non-transitory computer readable storage medium storing a computer program for a server including memory and a computer, the memory being configured to store device identification information and service identification information in association with each other, the device identification information identifying a communication device among one or more communication devices, the service identification information identifying a service currently provided to a user of the communication device among a plurality of services, wherein the plurality of services include a first type of service having no exclusive attribute and a second type of service having the exclusive attribute, and wherein the exclusive attribute indicates that, in a state where a certain type of service is provided to a user of a certain communication device, another service of the certain type is not provided to the user of the certain communication device, the computer program comprising instructions that, when executed, cause the computer to perform:

receiving, from an external device, a registration request including first service identification information and specific device identification information, the first service identification information identifying a first service to be provided to a user of a specific communication device, the specific device identification information identifying the specific communication device;

a determination comprising:

in response to the registration request received from the external device, determining whether to provide the first service to the user of the specific communication device;

in response to the first service being the first type of service having no exclusive attribute, determining to provide the first service regardless of whether the specific device identification information is stored in association with service identification information different from the first service identification information in the memory;

determining to provide the first service in response to the first service being the second type of service having the exclusive attribute and the specific device identification information being not stored in association with service identification information identifying the second type of service different from the first service in the memory; and determining not to provide the first service in a specific case where the first service is the second type of service having the exclusive attribute and the specific device identification information is stored in association with second service identification information in the memory, the second service identification information identifying a second service that is the second type of service different from the first service; and a memory control comprising, in response to a determination to provide the first service, storing the first service identification information in the memory in association with the specific device identification information.

* * * * *

UNITED STATES PATENT AND TRADEMARK OFFICE
CERTIFICATE OF CORRECTION

PATENT NO. : 11,726,727 B2
APPLICATION NO. : 17/679354
DATED : August 15, 2023
INVENTOR(S) : Koichi Hayashi Page 1 of 1

It is certified that error appears in the above-identified patent and that said Letters Patent is hereby corrected as shown below:

In the Claims

Column 18, Claim 2, Line 51 should read:
wherein the instructions, when executed by the processor, Column 20, Claim 6, Line 27 should read:
the specific communication device in response to a Column 20, Claim 7, Lines 37-38 should read:
further cause the server to perform in the first determination:

Signed and Sealed this
Twenty-first Day of November, 2023

Katherine Kelly Vidal
*Director of the United States Patent and Trademark Office*